United States Patent [19]

Ring et al.

[11] Patent Number: 4,749,000

[45] Date of Patent: Jun. 7, 1988

[54] NORMALLY OPEN PNEUMATIC AIR VALVE

[75] Inventors: H. K. Ring, Houston, Minn.; Dennis L. Manthei, West Salem; Steven C. Weber, La Crosse, both of Wis.

[73] Assignee: American Standard Inc., New York, N.Y.

[21] Appl. No.: 109,657

[22] Filed: Oct. 19, 1987

[51] Int. Cl.[4] .......................................... F16K 31/126
[52] U.S. Cl. .................................. 137/219; 251/61.2; 251/61.4
[58] Field of Search ............ 137/219; 251/61.2, 61.3, 251/61.4, 61.5

[56] References Cited

U.S. PATENT DOCUMENTS

| | | | |
|---|---|---|---|
| 2,821,343 | 1/1958 | Payne | 236/13 |
| 2,882,008 | 4/1959 | Giauque | 251/61.4 |
| 3,432,139 | 3/1969 | Jentoft | 137/219 X |
| 3,974,859 | 8/1976 | McNabney . | |
| 4,082,114 | 4/1978 | Hantke et al. . | |
| 4,177,970 | 11/1979 | Ring, Jr. . | |
| 4,305,418 | 12/1981 | Jensen et al. | 137/219 |

*Primary Examiner*—Gerald A. Michalsky
*Attorney, Agent, or Firm*—William J. Beres; David L. Polsley; Robert J. Harter

[57] ABSTRACT

A normally open pneumatic air control valve includes an inlet section which defines a seating surface and a support grid. A support plate, located downstream of the inlet section, is itself supported by a plurality of rods extending from the inlet section. A damper assembly is disposed for movement axial of the inlet section and is supported for such movement between the inlet section support grid and the downstream support plate. The damper assembly is actuated by the admission of a pressurized gas to a chamber cooperatively defined by a housing fixed to the support plate and a diaphragm disposed therein. A spring acts on the fixed grid support of the inlet section and on the damper assembly to urge the damper assembly away from the inlet section so that the valve is biased to the open position.

16 Claims, 3 Drawing Sheets

NORMALLY OPEN PNEUMATIC AIR VALVE

DESCRIPTION

BACKGROUND OF THE INVENTION

The present invention relates generally to inventions which are the subject matter of concurrently filed patent application Ser. Nos. 109,653 and 109,892 entitled "Normally Closed Pneumatic Air Valve" and "Electric Air Valve" both of which are assigned to the assignee of the present invention.

The present invention relates to a pneumatic air valve for use in an air distribution system wherein the volume of conditioned air supplied to a zone is varied in order to control the temperature within the zone.

One of the most common types of building ventilation systems is the variable air volume system wherein a central source provides conditioned air which is distributed to various zones within the building via a network of ducts. Since heating and cooling requirements vary from zone to zone, and within individual zones depending upon factors such as solar load and zone usage, it is necessary that provision be made to selectively control the amount of conditioned air supplied to a particular zone in response to local demand.

In a variable air volume system, the selective delivery of conditioned air to a particular zone is accomplished through the provision of at least one air distribution box associated with each zone. Such air distribution boxes define supply plenums and include one or more air outlets in communication with the zone. Additionally, each box has an airflow control valve, for varying the volume of air delivered into the plenum. Such air valves are controlled by a thermostat in the zone so as to supply the proper volume of conditioned air to the zone to maintain or achieve a selected zone temperature.

The present invention is directed to a normally open pneumatic air valve assembly for use in a variable air volume air distribution system.

Typical pneumatically operated air valves are illustrated and described in U.S. Pat. Nos. 4,082,114, to Hantke et al., which is assigned to the assignee of the present invention, and 4,305,418, to Jensen et al. The valve of the Hantke patent includes a closed ended cylindrical portion downstream of the valve inlet in which a generally tubular valve member is disposed for movement axially of the valve housing. The size of a series of radial ports, and therefore the flow of air through the valve, is determined by the position of the valve member within the cylindrical, closed ended valve housing. The valve of the Hantke design is relatively complex and is, as well, somewhat expensive of manufacture. Additionally, dedicated sealing means are required at each peripheral edge of the tubular valve member in order to completely shut off airflow through the valve.

The Jensen valve is a normally closed valve the damper of which is disposed for axial movement interior of a solid, geometrically precise, unitary valve casing. The shape of the valve casing is critical and is selected so as to compensate for the variation of the drag coefficient of the valve. Such variation results from the movement of the damper which is entirely within the valve casing.

The need continues to exist for a normally open pneumatic air valve which is uncomplicated and inexpensive of manufacture yet which provides for the precise control of the volume of air flowing through the valve. The present invention is directed generally to a normally open pneumatic air valve which achieves the precise control of the volume of air flowing therethrough yet which is quiet, relatively inexpensive and extremely reliable.

SUMMARY OF THE INVENTION

It is an object of the present invention to provide an air valve assembly which includes novel yet simple actuator means which is integral with the valve and which eliminates the need for separately mounting the actuator portion of the valve.

It is another object of the present invention to provide an air valve assembly wherein the valve actuator is disposed downstream of both the valve inlet and valve damper for achieving the quiet, controlled flow of air through the valve.

It is another object of the present invention to provide an air valve having a die cast inlet section which defines a venturi-like passage so as to reduce system static pressure requirements.

It is another object of the present invention to provide an air valve having essentially only one moving part and which employs no set screws, levers, blades or linkages.

It is still another object of the present invention to provide an air valve having an inlet section which is configured for mounting to an air distribution box so as to support the entire structure of the valve in a manner which allows for the efficient mounting of the valve to the box and removal of the valve therefrom.

It is a further object of the present invention to provide a normally open pneumatically operated air valve of reduced complexity which eliminates the need for a discrete seal in order to achieve airflow shutoff and which performs in a manner which meets or exceeds the performance of prior air valves.

These and other objects of the present invention, which will become apparent when the following Description of the Preferred Embodiment and attached drawing figures are simultaneously considered, are accomplished by an air valve having a unitary inlet section which defines a seating surface and a spider-like grid support in its upstream portion. For purposes of this patent, upstream will refer to the direction from which air is supplied to the valve while downstream will refer to the direction of airflow through the valve as is indicated by the arrows in the drawing figures.

A generally planar damper having a peripheral seating surface is pneumatically moveable axially of the valve inlet section between a position wherein the damper seats on the inlet section seating surface and a position wherein the damper is retracted from that seating surface and from of the inlet section.

The damper plate is supported for movement axially of the valve inlet on a spindle which slidingly penetrates the support spider of the inlet section. The spindle is connected to the damper plate through a cup-like member. A spring acts on the inlet section spider and the cup-like member which attaches the damper plate to the spindle so that the damper plate is at all times biased away from the inlet section seating surface.

The end of the cup-like member attached to the rod-like spindle is compliantly captured by a diaphragm disposed in a housing which is open at one end and closed at its other end. The diaphragm and closed end of the housing cooperate to define a closed chamber.

The open end of the housing acts to guide the movement of the diaphragm and to restrain the lateral movement of the cup-like member when air is admitted to the chamber defined by the diaphragm and housing.

When air is admitted at a predetermined rate and at a predetermined pressure into the chamber defined by the diaphragm and closed ended housing, the volume of the chamber increases and the diaphragm acts on the cup-like member, and therefore on the damper plate, to urge the damper plate toward the seating surface of the inlet section. The housing in which the diaphragm is disposed is supported by a backplate located downstream of both the damper plate and inlet section. The backplate is supported by a plurality of rods extending from the inlet section and, due to its location, does not interact with air flowing through the valve. An air supply line is provided through which pressurized air is admitted to and released from the chamber defined by the housing and the diaphragm.

The valve of the present invention advantageously provides for the precise control of the volume of conditioned air delivered to an air distribution box, is lightweight and economical of manufacture. The valve is also, advantageously, of uncomplicated construction, having support and actuator apparatus which are essentially downstream of the air inlet and damper so that a relatively unobstructed path is defined for air flowing through the valve. The essentially clean airflow path through the valve provides for extremely quiet airflow which is a significant feature and consideration in the employment of such valves. Further, the valve of the present invention advantageously does not require discrete sealing means to achieve the shutoff of air through the valve.

DESCRIPTION OF THE PREFERRED EMBODIMENT

Figure 1:
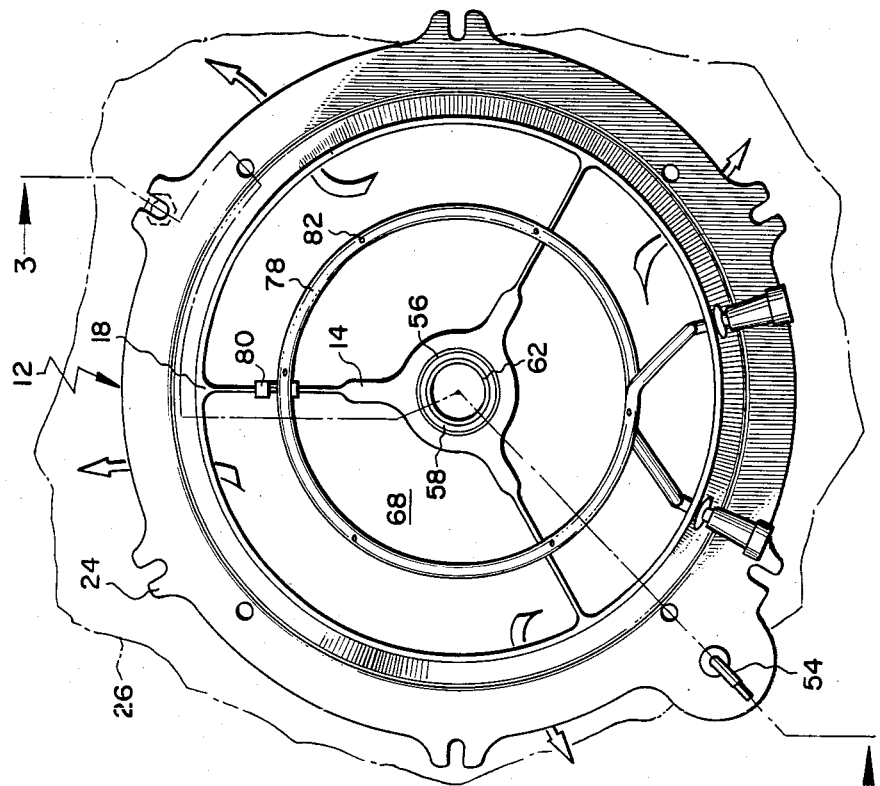
FIG. 1 is an end view of the air valve of the present invention from a position upstream of the valve.
Figure 2:
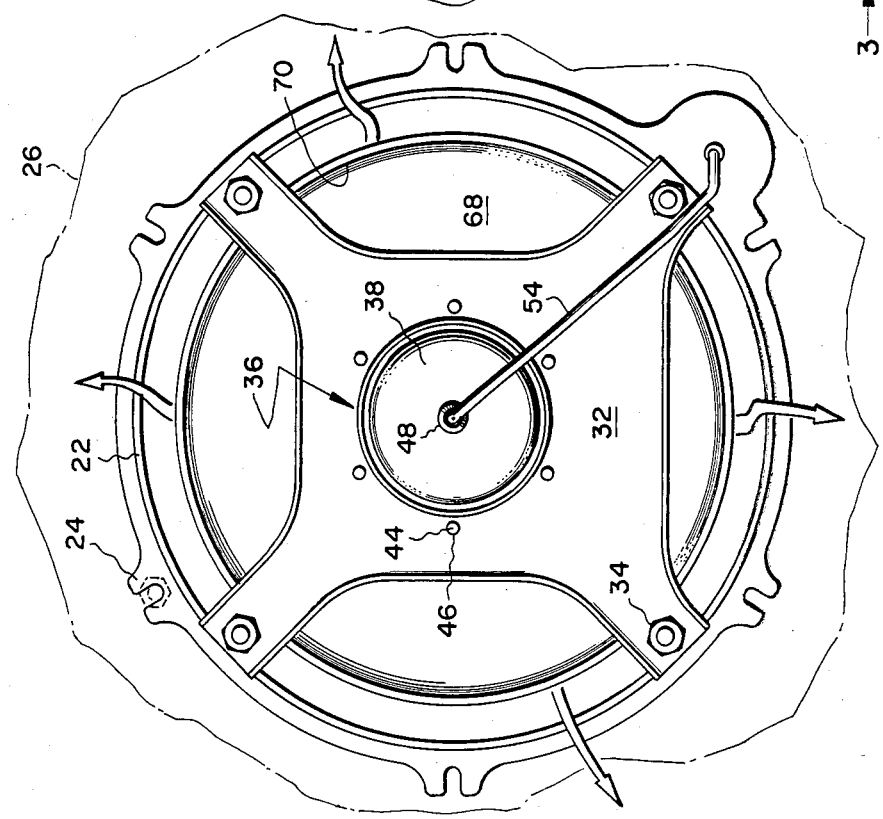
FIG. 2 is an end view of the valve of the present invention from a downstream position.

Referring to all of the drawings figures concurrently, valve 10 has a die cast unitary inlet section 12 which defines a spider-like support grid 14 and a seating surface 16. The venturi-like nature of the passage defined by inlet section 12 results in lower static pressure requirements for and quieter operation of the system in which valve 10 is employed.

Upstream of seating surface 16 is a generally tubular inlet portion 18 in which grid 14 is disposed. Mounting portion 20 of the inlet section includes a generally annular support ring 22 from which attachment lugs 24 extend radially outward so as to permit the mounting of inlet section 12 to a wall 26, shown in phantom, of an air distribution box.

Threaded into accommodating threaded portions 28 of support ring 22 are a plurality of support rods 30. Support rods 30 extend downstream of inlet section 12 interior of the distribution box and, in the preferred embodiment, are also threaded at their downstream ends. A support plate 32 is fixedly secured by nuts 34 to the downstream ends of the support rods.

In the Preferred Embodiment, a housing 36, which is closed at one end and open at the other is supported by support plate 32. Housing 36 is comprised of a closed portion 38 and an open portion 40. Each of portions 38 and 40 have cooperating flanges between which the edge of a diaphragm 42 is trapped.

Sheet metal screws 44 penetrate the flanges of portions 38 and 40 of housing 36 as well the edges of diaphragm 36 and thread into cooperating holes 46 in support plate 32. Housing 36 and diaphragm 42 are therefore fixedly mounted on the support plate in a co-axial fashion with respect to the axis of inlet section 12.

A grommet 48 is disposed in the end of the closed portion 38 of housing 36. Grommet 48 defines an air passage 50 through which air is delivered into and released from chamber 52 which is defined by housing 36 and diaphragm 42. A pneumatic feed tube 54 defines the passage through which pressurized air is delivered into and is vented from chamber 52. Feed tube 54 is connected to a source of pressurized air which is not shown in the drawing figures.

Spider-like grid 14 defines an aperture 56 in which a bushing 58 is disposed. Bushing 58 is retained in place by a series of screws 60 which thread into grid 14.

Figure 3:
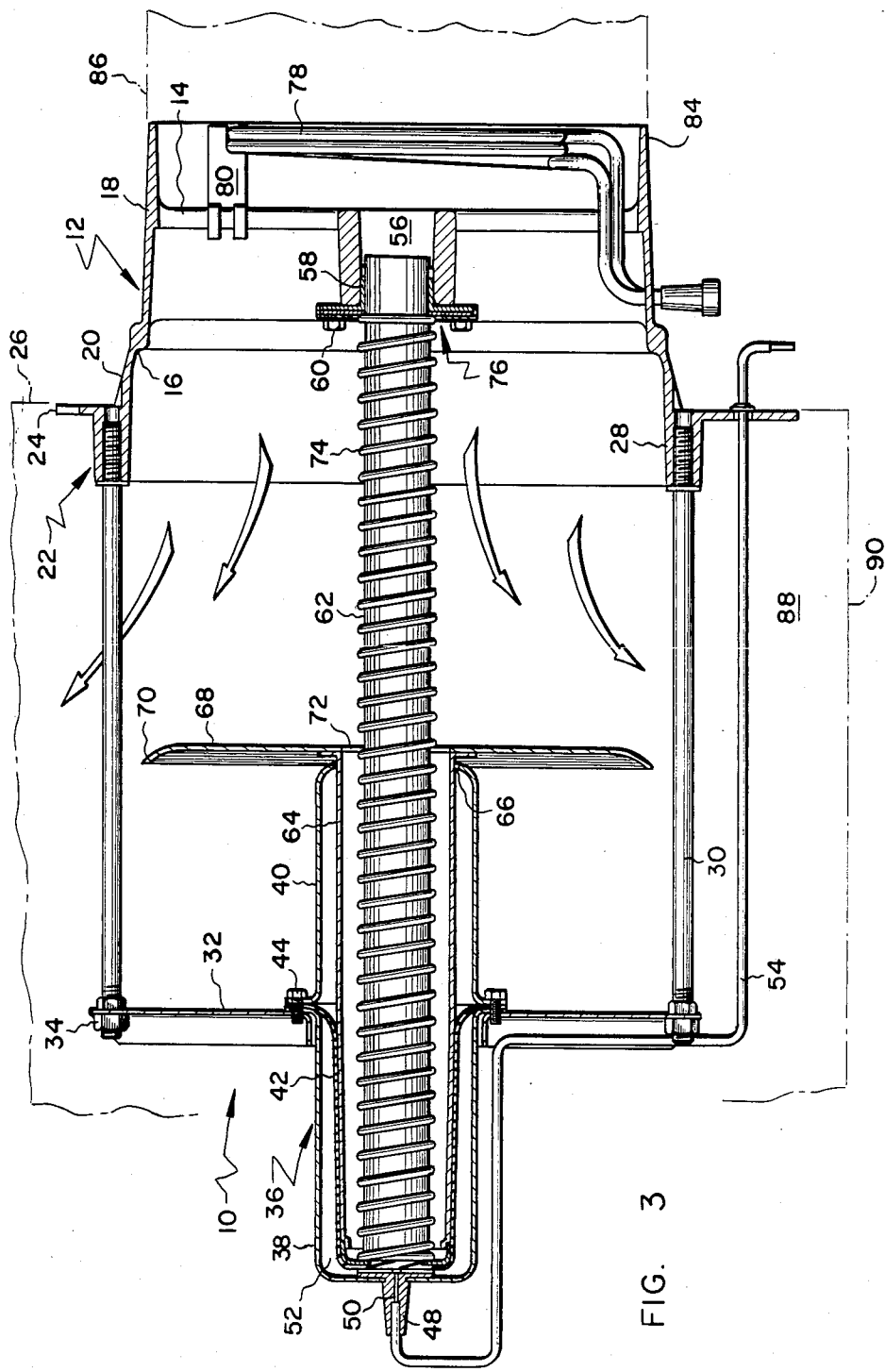
FIG. 3 is a cross-sectional view of the valve of the present invention taken along line 3—3 of FIG. 1 when the valve is in the open position.
Figure 4:
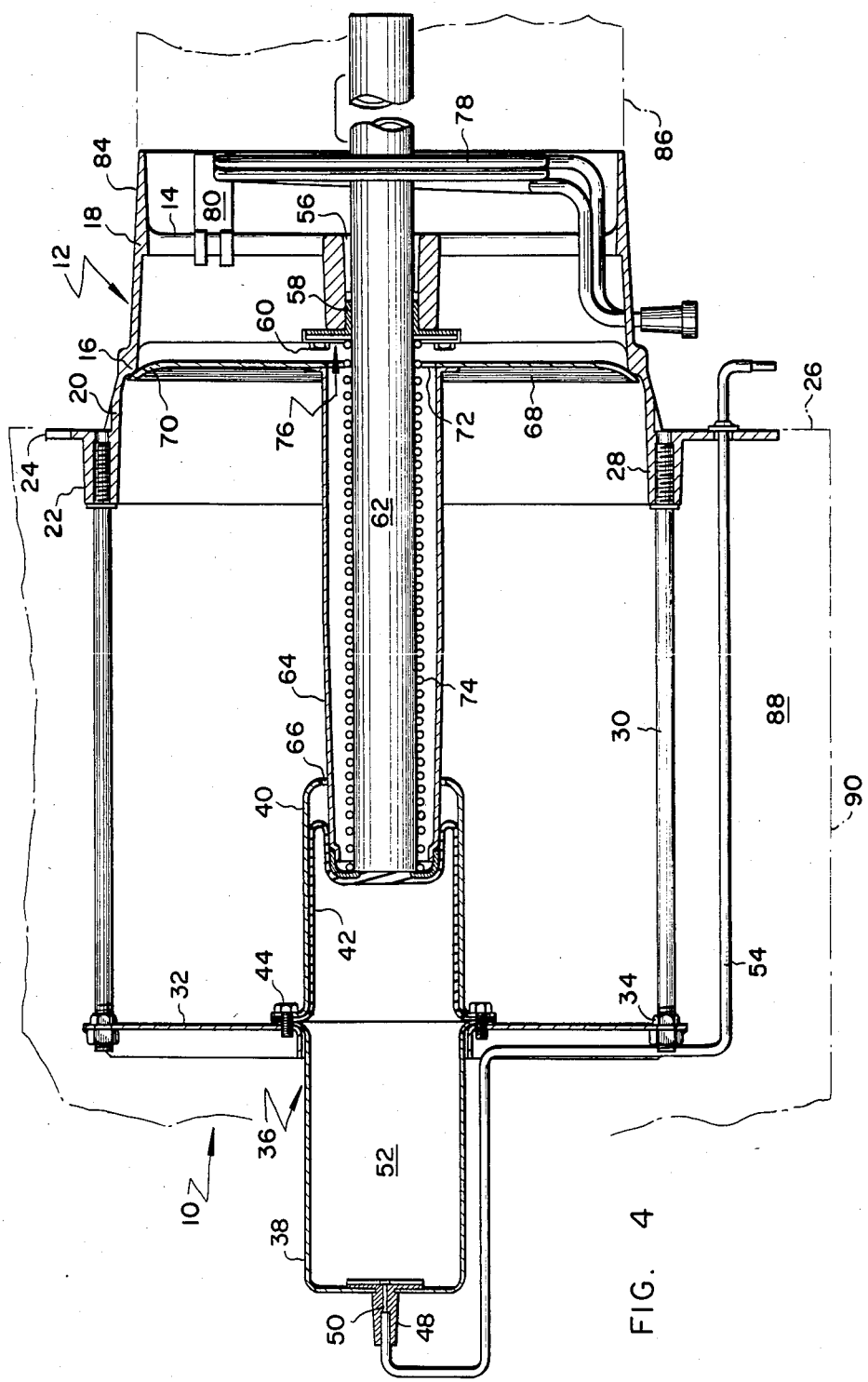
FIG. 4 is a cross-sectional view according to FIG. 3 wherein the valve of the present invention is shown in its closed position.

Slideably supported by bushing 58 is a rod-like spindle 62 which, depending upon the operational position of the air valve, is retracted into aperture 56, as is illustrated in FIG. 3, or penetrates and extends upstream of inlet section 12, as is illustrated in FIG. 4. At its opposite end, spindle 62 is attached to cup-like guide sleeve 64 which is acted upon and compliantly trapped in diaphragm 42. Sleeve 64 penetrates the aperture 66 of open portion 40 of housing 36 and is fixedly attached to a generally planar damper plate 68 which has a formed seating surface 70 about its periphery. Rod-like spindle 62 and sleeve 64 comprise spindle means which guidably support damper plate 68 within the valve 10.

Damper 68 defines an aperture 72 through which spindle 62 extends upstream and into bushing 58 in grid 14. A spring 74 acts on sleeve 64 and therefore on spindle 62 and damper plate 68 to both of which sleeve 64 is fixedly attached. Spring 74 additionally acts on a fixed surface 76 of spider-like grid 14. Because spring 74 acts on a fixed surface of grid 14, it continuously urges sleeve 64, and therefore, damper plate 68 and spindle 62, all of which are axially movable of inlet section 12, away from seating surface 16 of the inlet section. It will be appreciated, therefore, that spring 74 comprises means for biasing damper plate 68 away from seating surface 16 so that absent sufficient pressure in chamber 52 valve 10 will normally be open.

A flow sensing element 78 is disposed in the upstream portion of inlet section 12 and is retained in place by a series of clips 80. Flow sensor 78 defines a series of spaced apart apertures 82 according to which a static pressure is developed which reflects the rate of airflow through the valve.

In operation, if chamber 52 is not pressurized by the admission of air to it through tubing 54 or if the pressure in chamber 52 is insufficient, spring 74 acts on sleeve 64 so as to urge it, spindle 62 and damper plate 68 away from seating surface 16 of inlet section 12. In FIG. 3 it will be seen that diaphragm 42 is resting on grommet 48 of housing 36 and that damper plate 68 is fully retracted from seating surface 16.

The position of valve 10 represented by FIG. 3 is the fully open position of the valve and is a position in which the maximum amount of air is allowed to flow through valve 10 by virtue of the complete retraction of damper plate 68 out of inlet section 12. Since damper plate 68, sleeve 64 and spindle 62 comprise an essentially unitary damper assembly, when spring 74 acts on sleeve 64 so as to urge it, spindle 62 and damper plate 68 downstream, the entire damper assembly is caused to move and is essentially retracted out of inlet section 12.

It will be noted, according to FIG. 3, that when the valve is in its fully opened position, diaphragm 42 compliantly overlies and conforms to the downstream end of guide sleeve 64.

There is relatively small resistance to the flow of air through valve 10, when in the open position, by virtue of the location of the actuator apparatus downstream of damper plate 10 and the retraction of the damper assembly out of the inlet section. Air entering inlet section 12 encounters damper plate 68, only subsequent to entering the distribution box, and the formed peripheral edge of the damper plate smoothly deflects the flow of air into the interior of the box. Valve 10 is therefore extremely quiet in operation as air entering the valve does not encounter bulky actuator apparatus or the like which induce flow noise.

Referring concurrently to FIGS. 3 and 4, as pressurized air is admitted to chamber 52 through tube 54, pressure builds in chamber 52. When the pressure in chamber 52 is sufficient to overcome the biasing force of spring 74 diaphragm 42 acts on the downstream end of sleeve 64 so as to urge it, damper plate 68 and spindle 62 toward inlet section 17 of housing 36 in the upstream direction.

As the volume of chamber 52 continues to increase diaphragm 42 effectively peels away from the outer surface of the downstream portion of cup-like sleeve 64 and comes into conformable contact with the inner surface of open portion 40 of housing 36. Because diaphragm 42 is flexible, sleeve 64 and therefore the damper assembly will tend to be centered by the air pressure and its effects on diaphragm 42 within housing 36. Sleeve 64, damper plate 68 and spindle 62 are therefore self-centering, in a compliant fashion, under the influence of diaphragm 42 within valve 10 and with respect to the axis of inlet section 12.

Even if the axis of sleeve 64 or of the damper assembly is somewhat misaligned, with respect to the axis of the inlet section 12, when damper plate 68 is driven into contact with seating surface 16 of inlet section 12, damper plate 68 will tend to seat itself with respect to the inlet section seating surface due to the compliance of diaphragm 42 and due to the cooperative curved geometries of the inlet section seating surface and the formed damper plate seating surface.

It is conceivable that in seating itself damper plate 68 might cause a slight cocking of spindle 62 and sleeve 64 with respect to the longitudinal axis of inlet section 12. However, the operation of the valve is very forgiving from the standpoint of damper plate and damper assembly alignment with respect to the axis of the inlet section. Because of this damper assembly/actuator arrangement, the valve is not susceptible to sticking shut or open which is a common occurrence in some valve designs. Further, the cooperation of the formed damper plate edge and the seating surface of the inlet section eliminates the need for a discrete seal to ensure the full closure of the valve to airflow.

At the point where seating surface 70 of damper plate 68 contacts and abuts seating surface 16 of inlet section 12, the damper plate, sleeve 64 and spindle 62 are physically constrained from any further movement axially of inlet section 12 in an upstream direction. As long as sufficient pressure is maintained in chamber 52 to overcome the biasing force of spring 74, valve 10 will remain closed and no air will be allowed to pass through inlet section 12 around damper 68. When the valve is in the fully closed position of FIG. 4, spring 74 is compressed and spindle 62 is driven through aperture 56 of grid 14 and extends upstream and out of inlet section 12.

At such time as the pressure is controllably released in chamber 52 to an extent which is overcome by the biasing force of spring 74, sleeve 64, spindle 62 and damper plate 68 are driven by spring 74 in a downstream direction thereby opening valve 10 for airflow therethrough. It will be appreciated that the axial position of damper plate 68 with respect to inlet section 12 is determinitive of the volume of air which flows through the inlet section and therefore through valve 10.

It will also be appreciated that by controlling the delivery and release of pressurized air into and from chamber 52, damper plate 68 can be positioned in any position between the fully open position illustrated in FIG. 3 and the fully closed position illustrated in FIG. 4. Therefore, the modulation of the volume of air delivered through valve 10 over a continuous range of volumes is achieved by the valve.

It is also to be noted that diaphragm 42 is restrained by and conforms to the interior surface of open section 40 of housing 36 as damper plate 68 approaches the closed position illustrated in FIG. 4. Open portion 40 of housing 36 therefore acts as a guide for sleeve 64 through diaphragm 42 whereby the alignment of the damper assembly is flexibly maintained as it travels axially of inlet section 12. It should also to be noted that the surface 84 of the upstream portion of inlet portion 18 of inlet section 12 is configured so as to be received into duct work 86 which is shown in phantom in FIGS. 3 and 4.

Opening 66 of open portion 40 of housing 36 is sized so as to typically allow for the free and slideable movement of sleeve 64 therethrough. Only if sleeve 64 becomes misaligned to a greater than permissible extent, does sleeve 64 physically contact open housing portion 40. In the event that sleeve 64 contacts open portion 40 it is caused to be realigned with respect to the inlet section by such slideable contact.

When valve 10 is in the fully open position, air entering valve 10 through inlet section 12 encounters essentially only the resistance of damper plate 68, which is far downstream of inlet section 12, in its flow into plenum 88 of air distribution box 90. Once again, distribution box 90 is shown in phantom in FIGS. 3 and 4.

It will be appreciated that the only impediment to airflow into plenum 88 downstream of inlet section 12, other than damper 68, when valve 10 is in the fully open position, is the plurality of rods 30 which extend downstream of inlet section 12 within the distribution box and which support the actuator and damper assembly portions of the valve through support plate 32. The radius of the rods, which comprise an essentially openwork support grid, represents essentially no impediment to airflow out of inlet section 12 and damper plate 68, in its fully open position, is sufficiently downstream of inlet section 12 to effectively allow for the flow of air through the inlet section in an entirely unimpeded fashion when the valve is fully open.

It will be appreciated that many variations and modifications of the valve of the present invention are possible given the teachings herein and that such modifications are contemplated as being within the scope of this invention which is to be limited only in accordance with the language of the claims which follow.

What is claimed is:

1. A pneumatic air valve comprising:
    an inlet section defining a seating surface;
    damper means, including a damper plate, moveable axially of said inlet section between a closed position wherein said damper plate seats on said seating surface and an open position wherein said damper plate is positioned away from said seating surface and downstream of said inlet section;
    means upstream of said inlet section seating surface, for supporting said damper means;
    means for biasing said damper means away from said inlet section seating surface;
    actuator means, downstream of said inlet section and said damper plate, for controllably positioning said damper means between said open position and said closed position, said actuator means including a diaphragm which cooperates with a housing to define a pressure chamber, the volume of said pressure chamber increasing and said damper means being moved toward said seating surface of said inlet section when the pressure in said chamber overcomes the biasing force of said biasing means; and
    openwork grid means, downstream of and supported by said inlet section, for supporting said housing of said actuator means.

2. The air valve according to claim 1 wherein said means for supporting said damper means comprises a support grid internal of said inlet section and wherein said damper means includes spindle means, attached to said damper plate, for supporting said damper plate for movement axial of said inlet section, said spindle means being acted upon by said diaphragm and being captured for slideable movement through said support grid in said inlet section.

3. The air valve according to claim 2 wherein said damper plate has a peripheral, formed seating surface and wherein said spindle means is acted upon by said diaphragm in a compliant fashion so that the seating surface of said damper plate abuts said seating surface of said inlet section to form an essentially uninterrupted seal therebetween, irrespective of the misalignment of said spindle means with the longitudinal axis of said inlet section prior to such abutment.

4. The air valve according to claim 3 wherein said housing of said actuator means comprises a generally cylindrical housing closed at a first end and open at a second end, said cylindrical housing being co-axial with the axis of said inlet section and said open end being oriented toward said inlet section, a portion of said spindle means penetrating said housing and said damper plate.

5. The air valve according to claim 4 wherein said means for biasing penetrates said damper plate and comprises means acting on a fixed surface of said inlet section and on a surface of said spindle means.

6. The air valve according to claim 5 wherein said spindle means comprises a rod-like spindle and a cup-like connecting portion, said rod-like spindle slideably penetrating said damper plate and said inlet section support grid and said cup-like portion being attached both to said rod-like spindle downstream of said damper plate and to said damper plate.

7. The air valve according to claim 6 wherein said means for biasing comprises a compression spring disposed around said rod-like spindle.

8. The air valve according to claim 7 wherein said diaphragm compliantly captures said cup-like connecting portion of said spindle means and wherein said diaphragm is constrained for movement between said open ended housing and said cup-like connecting portion.

9. A normally open pneumatic air valve comprising:
    a generally planar damper having a formed peripheral seating surface;
    a generally cylindrical inlet section having a surface, which is abutted by said damper seating surface when said air valve is closed, and a support grid upstream thereof;
    means for supporting said damper for movement axial of said inlet section, said means for supporting being supported for slideable movement axial of said inlet by said inlet support grid;
    means for biasing said damper away from said inlet section;
    means, acting through said damper support means, for selectively positioning said damper between a first position, in which said valve is closed and in which said damper seating surface abuts said inlet section seating surface, and a second position, in which said damper is retracted from said inlet section seating surface, said means for selectively positioning said damper including a housing in which a diaphragm is disposed so as to define a closed chamber, the expansion of the volume of said chamber urging said damper, through said diaphragm and said damper support means, toward said first position; and
    means, attached to and downstream of said inlet section, for supporting said housing of said means for selectively positioning said damper, said means for supporting said housing being downstream of said inlet section.

10. The air valve according to claim 9 wherein said means for supporting said housing comprises a support plate attached to said inlet portion by a plurality of rods, said support plate and said means for selectively positioning said damper being downstream of said damper.

11. The air valve according to claim 10 wherein said housing of said means for positioning said damper comprises an open ended generally cylindrical housing the open end of which is oriented toward said damper, and wherein said means for supporting said damper comprises spindle means, said spindle means penetrating said damper and slideably penetrating said support grid, a portion of said spindle means being disposed at least partially in said housing, said spindle means being acted on by said damper and being responsive to a change in the volume of said chamber defined in said housing so as to position said damper in said valve.

12. The air valve according to claim 11 wherein said spindle means is comprised of a rod-like spindle which penetrates said damper and is supported by said inlet section support grid and a cup-like sleeve which connects one end of said rod-like spindle to said damper, said cup-like sleeve being captured by said diaphragm in a compliant manner so that the peripheral seat of said damper is brought into sealing abutment with said inlet section seating surface despite the misalignment of said damper with respect to said inlet section seating surface prior to its being brought into abutment with said inlet section seating surface.

13. The air valve according to claim 12 wherein said biasing means comprises a spring which acts on said support grid and on said spindle means.

14. A normally open pneumatic air valve for a variable air volume system comprising:
 a generally tubular unitary inlet section defining a venturi-like passage and having a seating surface and a support spider;
 a generally tubular housing closed at a first end and open at a second end, said open end being oriented toward said inlet section;
 means, attached to and extending from said inlet section, for supporting said tubular housing in a generally co-axial relationship with the axis of said inlet section;
 a diaphragm sealingly disposed in said housing and cooperating with the closed end thereof to define a chamber;
 damper means, selectively positionable between an open and a closed position, said damper means including both a generally planar damper plate defining an aperture in its center and means for supporting said damper plate for movement axial of said inlet section, said damper means for regulating the volume of air flowing through said valve, said means for supporting said damper plate comprising spindle means having a rod-like portion which penetrates said damper plate aperture, said rod-like portion of said spindle means being slideably supported at an upstream end by said inlet support spider and at a second end in said tubular housing, the position of said damper plate, with respect to said inlet section, and the volume of air flowing through said air valve being a function of the volume of said chamber in said housing; and
 means for biasing said damper means to said open position, said damper plate being urged away from said seating surface of said inlet section when the force of said biasing means exceeds the force opposing it as represented by the pressure in said chamber.

15. The valve according to claim 14 wherein the end of said spindle means opposite the upstream end of said rod-like portion is compliantly captured in and acted on by said diaphragm.

16. The valve according to claim 14 wherein said means for biasing comprises a spring disposed around said rod-like portion of said spindle means, said spring penetrating said damper plate aperture and acting on said support spider and on said spindle means to urge said spindle means and therefore said damper away from said inlet section.

* * * * *